United States Patent
Rimon et al.

(10) Patent No.: US 8,059,102 B2
(45) Date of Patent: *Nov. 15, 2011

(54) FINGERTIP TOUCH RECOGNITION FOR A DIGITIZER

(75) Inventors: Ori Rimon, Tel-Aviv (IL); Ariel Kerner, Herzlia (IL)

(73) Assignee: N-trig Ltd., Kfar-Saba (IL)

( * ) Notice: Subject to any disclaimer, the term of this patent is extended or adjusted under 35 U.S.C. 154(b) by 791 days.

This patent is subject to a terminal disclaimer.

(21) Appl. No.: 11/808,868

(22) Filed: Jun. 13, 2007

(65) Prior Publication Data

US 2007/0285404 A1  Dec. 13, 2007

Related U.S. Application Data

(60) Provisional application No. 60/812,994, filed on Jun. 13, 2006.

(51) Int. Cl.
*G06F 3/041* (2006.01)
*H03K 17/955* (2006.01)

(52) U.S. Cl. .......................... 345/173; 341/33

(58) Field of Classification Search .................. None
See application file for complete search history.

(56) References Cited

U.S. PATENT DOCUMENTS

| | | | | |
|---|---|---|---|---|
| 5,825,352 A * | 10/1998 | Bisset et al. | | 345/173 |
| 5,841,078 A | 11/1998 | Miller et al. | | |
| 6,075,520 A * | 6/2000 | Inoue et al. | | 345/173 |
| 6,222,528 B1 * | 4/2001 | Gerpheide et al. | | 345/173 |
| 6,297,811 B1 | 10/2001 | Kent et al. | | |
| 6,498,602 B1 * | 12/2002 | Ogawa | | 345/173 |
| 6,690,156 B1 | 2/2004 | Weiner et al. | | |
| 6,778,686 B1 * | 8/2004 | Hestnes et al. | | 382/124 |
| 7,038,659 B2 * | 5/2006 | Rajkowski | | 345/156 |
| 7,190,348 B2 * | 3/2007 | Kennedy et al. | | 345/168 |
| 7,339,418 B2 * | 3/2008 | Regier | | 327/552 |
| 7,683,888 B1 * | 3/2010 | Kennedy | | 345/173 |
| 7,701,447 B2 * | 4/2010 | Lii et al. | | 345/173 |
| 7,868,874 B2 * | 1/2011 | Reynolds | | 345/173 |
| 2002/0015024 A1 * | 2/2002 | Westerman et al. | | 345/173 |
| 2002/0163506 A1 * | 11/2002 | Matusis | | 345/173 |
| 2003/0098858 A1 * | 5/2003 | Perski et al. | | 345/173 |
| 2003/0133598 A1 * | 7/2003 | Recce | | 382/115 |
| 2003/0179323 A1 | 9/2003 | Abileah et al. | | |
| 2004/0012579 A1 * | 1/2004 | Nagasaka et al. | | 345/204 |
| 2004/0021633 A1 * | 2/2004 | Rajkowski | | 345/156 |

(Continued)

FOREIGN PATENT DOCUMENTS

EP   0814423   12/1997

(Continued)

OTHER PUBLICATIONS

Response Dated Mar. 10, 2008 to Written Opinion of Sep. 27, 2007 From the International Searching Authority Re.: Application No. PCT/IL2007/000712.

(Continued)

*Primary Examiner* — Bipin Shalwala
*Assistant Examiner* — Daniel Bedell

(57) ABSTRACT

A method for verifying a fingertip touch input to a digitizer, the method comprises detecting a pattern of signals obtained from conductive lines of a digitizer sensor, comparing the pattern to a pre-determined fingertip characteristic, and recognizing a fingertip touch input based on the comparison.

43 Claims, 10 Drawing Sheets

U.S. PATENT DOCUMENTS

| | | | |
|---|---|---|---|
| 2004/0056245 A1* | 3/2004 | Thomas et al. | 257/40 |
| 2004/0085300 A1* | 5/2004 | Matusis | 345/173 |
| 2004/0095333 A1* | 5/2004 | Morag et al. | 345/173 |
| 2004/0155871 A1* | 8/2004 | Perski et al. | 345/174 |
| 2004/0174832 A1* | 9/2004 | Geiger et al. | 370/295 |
| 2004/0178997 A1 | 9/2004 | Gillespie et al. | |
| 2005/0099398 A1 | 5/2005 | Garside et al. | |
| 2006/0012580 A1 | 1/2006 | Perski et al. | |
| 2006/0012581 A1* | 1/2006 | Haim et al. | 345/173 |
| 2006/0026521 A1* | 2/2006 | Hotelling et al. | 715/702 |
| 2006/0026535 A1* | 2/2006 | Hotelling et al. | 715/863 |
| 2006/0097991 A1* | 5/2006 | Hotelling et al. | 345/173 |
| 2006/0109252 A1 | 5/2006 | Kolmykov-Zotov et al. | |
| 2007/0075968 A1* | 4/2007 | Hall et al. | 345/157 |
| 2007/0097096 A1* | 5/2007 | Rosenberg | 345/173 |
| 2008/0005703 A1* | 1/2008 | Radivojevic et al. | 715/863 |
| 2008/0012835 A1 | 1/2008 | Rimon et al. | |
| 2008/0012838 A1 | 1/2008 | Rimon | |
| 2008/0218494 A1* | 9/2008 | Perski et al. | 345/174 |

FOREIGN PATENT DOCUMENTS

| | | |
|---|---|---|
| EP | 1335318 | 8/2003 |
| GB | 1486988 | 9/1977 |
| WO | WO 03/005293 | 1/2003 |
| WO | WO 2004/051392 | 6/2004 |
| WO | WO 2005/114369 | 12/2005 |
| WO | WO 2007/144881 | 12/2007 |
| WO | WO 2008/007372 | 1/2008 |

OTHER PUBLICATIONS

International Preliminary Report on Patentability Dated Jul. 9, 2008 From the International Preliminary Examining Authority Re.: Application No. PCT/IL2007/000712.

International Search Report Dated Sep. 27, 2007 From the International Searching Authority Re.: Application No. PCT/IL2007/000712.

Translation of Office Action Dated May 24, 2010 From the State Intellectual Property Office of the People's Republic of China Re. Application No. 200780030159.6.

Written Opinion Dated Sep. 27, 2007 From the International Searching Authority Re.: Application No. PCT/IL2007/000712.

International Preliminary Report on Patentability Dated Jan. 13, 2009 From the International Bureau of WIPO Re.: Application No. PCT/IL2007/000870.

International Search Report and the Written Opinion Dated Jun. 3, 2008 From the International Searching Authority Re. Application No. PCT/IL2007/000870.

Official Action Dated Jun. 17, 2010 From the US Patent and Trademark Office Re. U.S. Appl. No. 11/822,951.

Response Dated Sep. 13, 2010 to Office Action of May 24, 2010 From the State Intellectual Property Office of the People's Republic of China Re. Application No. 200780030159.6.

Response Dated Sep. 15, 2010 to Official Action of Jun. 17, 2010 From the US Patent and Trademark Office Re. U.S. Appl. No. 11/822,951.

Official Action Dated Nov. 15, 2010 From the US Patent and Trademark Office Re. U.S. Appl. No. 11/822,951.

Translation of Office Action Dated Nov. 11, 2010 From the State Intellectual Property Office of the People's Republic of China Re. Application No. 200780030159.6.

Response Dated Jan. 13, 2011 to Office Action of Nov. 11, 2010 From the State Intellectual Property Office of the People's Republic of China Re. Application No. 200780030159.6.

Response Dated Mar. 15, 2011 to Official Action of Nov. 15, 2010 From the US Patent and Trademark Office Re. U.S. Appl. No. 11/822,951.

Response Dated Jul. 12, 2011 to Office Action of Jun. 9, 2011 From the State Intellectual Property Office of the People's Republic of China Re. Application No. 200780030159.6.

Translation of Office Action Dated Jun. 9, 2011 From the State Intellectual Property Office of the People's Republic of China Re. Application No. 200780030159.6.

Response Dated Jul. 5, 2011 to Official Action of May 12, 2011 From the US Patent and Trademark Office Re. U.S. Appl. No. 11/822,950.

Official Action Dated May 12, 2011 From the US Patent and Trademark Office Re. U.S. Appl. No. 11/822,950.

* cited by examiner

FINGERTIP TOUCH RECOGNITION FOR A DIGITIZER

CROSS REFERENCE TO RELATED APPLICATION

The present application claims the benefit under section 35 U.S.C. §119(e) of U.S. Provisional Application No. 60/812,994 filed on Jun. 13, 2006 which is incorporated herein by reference.

FIELD OF THE INVENTION

The present invention relates to a digitizer, and more particularly to fingerertip touch sensitive digitizers.

BACKGROUND OF THE INVENTION

Touch technologies are commonly used as input devices for a variety of products. The usage of touch devices of various kinds is growing sharply due to the emergence of new mobile devices such as Personal Digital Assists (PDA), tablet PCs and wireless flat panel display (FPD) screen displays. These new devices are usually not connected to standard keyboards, mice or like input devices, which are deemed to limit their mobility. Instead there is a tendency to use touch input technologies of one kind or another. A stylus and/or fingertip may be used as a user interaction.

U.S. Pat. No. 6,690,156 entitled "Physical Object Location Apparatus and Method and a Platform using the same" and US Patent Publication No. 20040095333 entitled "Transparent Digitizer" both of which are assigned to N-trig Ltd., the contents of both which are incorporated herein by reference, describe an electro-magnetic method for locating physical objects on a FPD and a transparent digitizer that can be incorporated into an electronic device, typically over the active display screen. The digitizer sensor includes a matrix of vertical and horizontal conducting lines and sensors to sense an electric signal. Positioning the physical object at a specific location on the digitizer provokes a signal whose position of origin may be detected.

U.S. Patent Application Publication No. 20040155871 entitled "Touch Detection for a Digitizer" assigned to N-trig Ltd, which is incorporated herein by reference in its entirety, describes a digitizing tablet system capable of detecting position of both physical objects and fingertip touch using the same sensing conductive lines. Typically, the system includes a transparent sensor overlaid on a FPD. The digitizer's sensor includes a matrix of vertical and horizontal conducting lines to sense an electric signal. Touching the digitizer in a specific location provokes a signal whose position of origin may be detected.

U.S. Patent Application Publication No. 20060012580, entitled "Automatic switching for a dual mode digitizer" assigned to N-Trig, the contents of which is incorporated herein by reference, describes a method utilizing different types of user interactions, e.g. electromagnetic stylus and touch, in a digitizer system. A method for 'palm rejection' based on the size of the detected area of the touch, hence distinguishing between localized touch events and wide area touch events is described.

SUMMARY OF THE INVENTION

An aspect of some embodiments of the invention is the provision of a system and method for verifying that a signal input to a digitizer is a fingertip touch, e.g. touch intended by a user for user interaction. Verification that a signal input to a digitizer is a fingertip touch provides differentiating fingertip touch input from other detected signals on the digitizer, e.g. due to a hand resting on the digitizer, mechanical changes between the digitizer and the LCD, not intended by a user for user interaction. According to some embodiments of the present invention, verification that a signal input to a digitizer is a fingertip touch is facilitated by recognition of one or more pre-determined patterns of signals received on the digitizer grid. Patterns used to verify that a signal input to a digitizer is a fingertip touch in exemplary embodiments of the present invention are described.

According to some embodiments of the present invention, a pre-determined signal pattern used to verify fingertip touch includes a pattern of signal amplitudes detected on an array of conductive lines of the digitizer grid, e.g. an array of 4 conductive lines and/or detected on output from an array of differential amplifiers associated with the conductive lines, e.g. an array of 4 differential amplifiers. In some exemplary embodiments, the pre-determined pattern is constructed from a pattern of signal amplitude outputs on both the vertical and horizontal conductive lines of the digitizer grid. In some exemplary embodiments, the pre-determined pattern is constructed from signal amplitudes above one or more pre-defined thresholds. In some exemplary embodiments of the present invention, an area on the digitizer grid on which input signals are detected is determined and used together with pre-determined signal pattern recognition to verify that a signal input to a digitizer is a fingertip touch. In some exemplary embodiments of the present invention, the dimensions over which the input signals are detected is determined and used together with pre-determined signal pattern recognition to verify that a signal input to a digitizer is a fingerertip touch.

According to some embodiments of the present invention, a pre-determined signal pattern used to verify fingertip touch includes a pattern of signal amplitude gradients, e.g. spatial gradients detected on an array of conductive lines of the digitizer grid and/or spatial gradient of the differential amplifier's outputs In some exemplary embodiments, the pre-determined pattern is constructed from a pattern of signal amplitude gradients on both the vertical and horizontal conductive lines of the digitizer grid. In some exemplary embodiments, the pre-determined pattern is constructed from signal amplitude gradients above one or more pre-defined thresholds.

In some exemplary embodiments of the present invention, an area on the digitizer grid on which input signals are detected is determined and used together with pre-determined signal pattern recognition to verify that a signal input to a digitizer is a fingertip touch. In some exemplary embodiments of the present invention, the dimensions over which the input signals are detected is determined and used together with pre-determined signal pattern recognition to verify that a signal input to a digitizer is a fingerertip touch.

According to some embodiments of the present invention, a pre-determined signal pattern used to verify fingertip touch includes a pattern of signal amplitudes and signal amplitude gradients detected on an array of conductive lines of the digitizer grid. In some exemplary embodiments the pre-determined signal pattern used to verify fingertip touch includes a relationship between signal amplitudes and signal amplitude gradients.

According to some embodiments of the present invention, a pre-determined signal pattern used to verify fingertip touch includes a relationship between patterns on orthogonal axes, e.g. horizontal and vertical axes, of the digitizer gird. In some exemplary embodiments, the pattern is a pattern of signal amplitudes. In some exemplary embodiments, the pattern is a pattern of signal amplitude gradients. In some exemplary embodiments of the present invention, the relationship is a relationship of the dimensions over which the input signals are detected. In some exemplary embodiments of the present invention, an area on the digitizer grid on which input signals are detected is determined and used together with pre-determined signal pattern recognition to verify that a signal input to a digitizer is a fingertip touch.

An aspect of some embodiments of the present invention provides a method for verifying a fingertip touch input to a digitizer, the method comprising detecting a pattern of signals obtained from conductive lines of a digitizer sensor; comparing the pattern to a pre-determined fingertip characteristic; and recognizing a fingertip touch input based on the comparison.

Optionally, the conductive lines are parallel conductive lines.

Optionally, the conductive lines include two orthogonal sets of parallel conductive lines forming a grid.

Optionally, the two orthogonal sets are electrically separated from each other.

Optionally, the parallel conductive lines are equally spaced.

Optionally, the parallel conductive lines are spaced 4 mm apart.

Optionally, pairs of the parallel conductive lines are input to differential amplifiers.

Optionally, the pattern is a pattern of differential amplifier outputs.

Optionally, the pairs of the parallel conductive lines are non-adjacent conductive lines.

Optionally, the pattern is a pattern of signal amplitudes.

Optionally, the pattern is a pattern of signal amplitudes above a pre-defined amplitude threshold.

Optionally, the pattern is a pattern of signal amplitude gradients.

Optionally, the pattern is a pattern of signal amplitude gradients above a pre-defined gradient threshold.

Optionally, the method comprises determining a number of gaps in the pattern of signals.

Optionally, the method comprises defining a maximum number of gaps below which the pattern of signals qualifies for verifying fingertip touch.

Optionally, the pattern of signals is detected using a capacitive touch method.

Optionally, the signal amplitude gradients are spatial high-pass filtered signals of the pattern of signals.

Optionally, the pattern is a contour pattern.

Optionally, the method comprises determining a ratio of a dimension of an area from which the digitizer sensor is detected; and defining a range of the ratio that qualifies for verifying fingertip touch.

Optionally, the method comprises determining an area from which a signal on the digitizer sensor is detected; and determining a range of the area that qualifies for verfying fingertip touch.

Optionally, the digitizer sensor is transparent.

Optionally, the detecting includes multi-touch detection.

An aspect of some embodiments of the present invention provides a system for verifying a fingertip input to a digitizer comprising: a digitizer sensor comprising a plurality of conductive lines; and a controller operative to verify a fingerertip touch input based detection of a pattern of outputs from the plurality of conductive lines.

Optionally, the plurality of conductive lines includes parallel conductive lines.

Optionally, the plurality of conductive lines includes two orthogonal sets of parallel conductive lines forming a grid.

Optionally, the two orthogonal sets are electrically separated from each other.

Optionally, the plurality of conductive lines is equally spaced.

Optionally, the plurality of conductive lines is spaced 4 mm apart.

Optionally, pairs of the parallel conductive lines are input to differential amplifiers.

Optionally, the pattern is a pattern of differential amplifier outputs.

Optionally, the pairs of the parallel conductive lines are non-adjacent conductive lines.

Optionally, the controller is operative to determine a pattern of signal amplitudes from the output.

Optionally, the controller is operative to determine a pattern of signal amplitudes from the output above a pre-defined amplitude threshold.

Optionally, the controller is operative to determine a pattern of signal amplitude gradients from the output.

Optionally, the controller is operative to determine a pattern signal amplitude gradients from the output above a pre-defined gradient threshold.

Optionally, the controller is operative to determine a number of gaps in the pattern of signals.

Optionally, the controller is operative to reject an input signal corresponding to a pattern with gaps above a pre-defined maximum number of gaps.

Optionally, the pattern of outputs is detected using a capacitive touch method.

Optionally, the signal amplitude gradients are high-pass filtered signal of the output.

Optionally, the pattern is a contour pattern.

Optionally, the controller is operative to determine a ratio of dimensions of an area from which the output is detected and to determine if the ratio is within a pre-defined range of ratios qualifying for verifying fingertip touch.

Optionally, the controller is operative to determine if the area is within a pre-defined range of areas qualifying for verifying fingertip touch and to determine if the dimension is within a pre-defined range of dimensions qualifying for verifying fingertip touch.

Optionally, the digitizer sensor is transparent.

Optionally, the controller is operative to detect multi-touch input.

Optionally, the system comprises a host computer, wherein the host computer is in communication with the controller.

Optionally, the controller transmits input verified as fingertip input to the host computer.

BRIEF DESCRIPTION OF THE DRAWINGS

The subject matter regarded is particularly and distinctly claimed in the concluding portion of the specification. Non-limiting examples of embodiments of the present invention are described below with reference to figures attached hereto, which are listed following this paragraph. In the figures, identical structures, elements or parts that appear in more than one figure are generally labeled with a same symbol in all the figures in which they appear. Dimensions of components and features shown in the figures are chosen for convenience and clarity of presentation and are not necessarily shown to scale. For example, the dimensions of some of the elements may be exaggerated relative to other elements for clarity.

Figure 1:
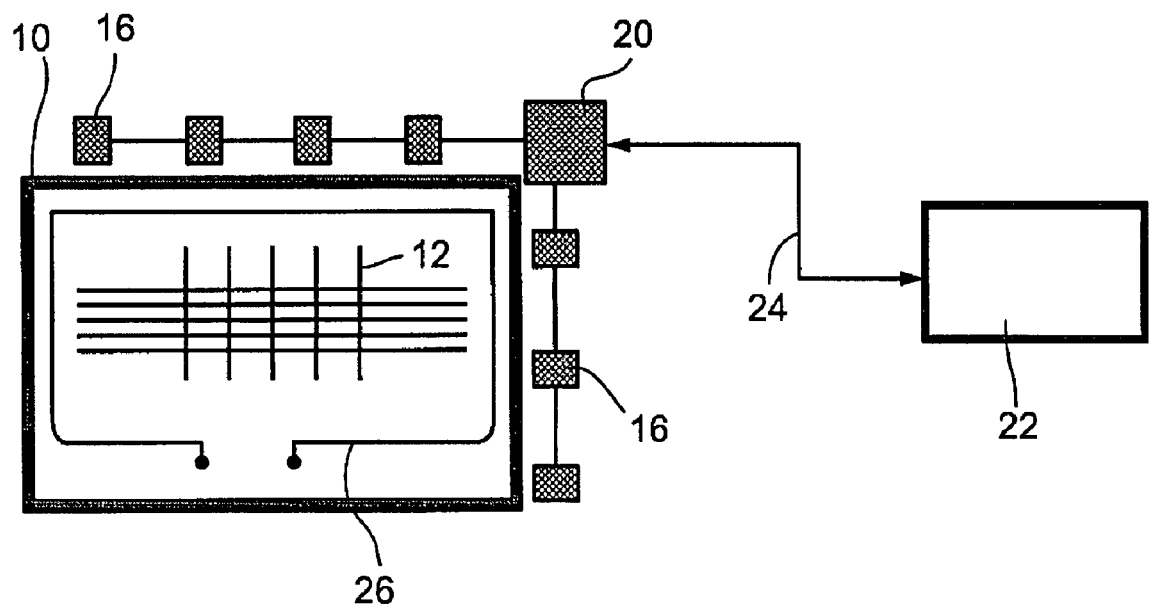
FIG. 1 is an exemplary simplified block diagram of a digitizer system in accordance with some embodiments of the present invention.

It will be appreciated that for simplicity and clarity of illustration, elements shown in the figures have not necessarily been drawn to scale. Further, where considered appropriate, reference numerals may be repeated among the figures to indicate corresponding or analogous elements.

DETAILED DESCRIPTION OF EXEMPLARY EMBODIMENTS

In the following description, exemplary, non-limiting embodiments of the invention incorporating various aspects of the present invention are described. For purposes of explanation, specific configurations and details are set forth in order to provide a thorough understanding of the embodiments. However, it will also be apparent to one skilled in the art that the present invention may be practiced without the specific details presented herein. Furthermore, well-known features may be omitted or simplified in order not to obscure the present invention. Features shown in one embodiment may be combined with features shown in other embodiments. Such features are not repeated for clarity of presentation. Furthermore, some unessential features are described in some embodiments.

Reference is now made to FIG. 1 showing an exemplary simplified block diagram of a digitizer system in accordance with some embodiments of the present invention. The digitizer system shown in FIG. 1 may be suitable for any computing device that enables interactions between a user and the device, e.g. mobile computing devices that include, for example, FPD screens. Examples of such devices include Tablet PCs, pen enabled lap-top computers, PDAs or any hand held devices such as palm pilots and mobile phones. According to some embodiments of the present invention, the digitizer system comprises a grid-based sensor 12, which is optionally transparent, and which is typically overlaid of an FPD 10. An ASIC 16 comprises circuitry to process and sample the output into a digital representation. The digital output signal is forwarded a digital unit 20, e.g. digital ASIC unit, for further digital processing. According to some embodiments of the present invention, the digital unit 20 together with the ASIC units 16 is the controller of the digitizer system and/or have functionality of a controller. The outcome, once determined, is forwarded to host 22 via interface 24 for processing by the operating system or any current application. According to some embodiments of the present invention, control functionality is also or exclusively included in the host 22.

According to some embodiments of the present invention, sensor 12 is a grid of conductive lines made of conductive materials, optionally Indium Tin Oxide (ITO), patterned on a foil or glass substrate. The conductive lines and the foil are optionally transparent. Typically, the grid is made of two layers, which are electrically separated from each other. Typically, one of the layers contains a set of equally spaced parallel conductors and the other layer contains a set of equally spaced parallel conductors orthogonal to the set of the first layer. Typically, the parallel conductors are equally spaced straight lines, and are the input to amplifiers included ASIC unit 16. Optionally the amplifiers are differential amplifiers. Typically, the parallel conductors are spaced at a distance of approximately 4 mm, e.g. 2-8 mm, optionally depending on the size of the FPD.

Typically, the ASIC unit is connected to outputs of the various conductors in the grid and functions to process the received signals at a first processing stage. As indicated above, ASIC unit 16 includes an array of amplifiers, e.g. differential amplifiers, to amplify the sensor's signals. Additionally, ASIC unit 16 includes one or more filters to remove irrelevant frequencies. Optionally, filtering is performed prior to sampling. The signal is then sampled by an A/D, optionally filtered by a digital filter and forwarded to digital ASIC unit, for further digital processing.

According to some embodiments of the invention, digital unit 20 reads the sampled data, processes it and determines the position of the physical objects, such as stylus, and/or finger touch. Calculated position is sent to the host computer via interface 24. According to some embodiments, digital unit 20 produces and manages a triggering pulse to be provided to excitation coil 26 that surrounds the sensor arrangement and the display screen. The excitation coil provides a trigger pulse that excites passive circuitry in the stylus to produce a response from the stylus that can subsequently be detected.

According to some embodiments, digital unit 20 produces and manages a triggering pulse to at least one of the conductive line.

Stylus Detection

According to some embodiments of the present invention the stylus is a passive element. Optionally, the stylus comprises a resonant circuit, which is triggered by excitation coil 26 to oscillate at its resonant frequency. Optionally, the stylus may include an energy pick-up unit and an oscillator circuit. At the resonant frequency the circuit produces oscillations that continue after the end of the excitation pulse and steadily decay. The decaying oscillations induce a voltage in nearby conductive lines which are sensed by the sensor 12. According to some embodiments of the present invention, two parallel sensor lines that are close but not adjacent to one another are connected to the positive and negative input of a differential amplifier respectively. The amplifier is thus able to generate an output signal which is an amplification of the difference between the two sensor line signals. An amplifier having a stylus on one of its two sensor lines will produce a relatively high amplitude output.

Fingertip Touch Detection

Figure 2:
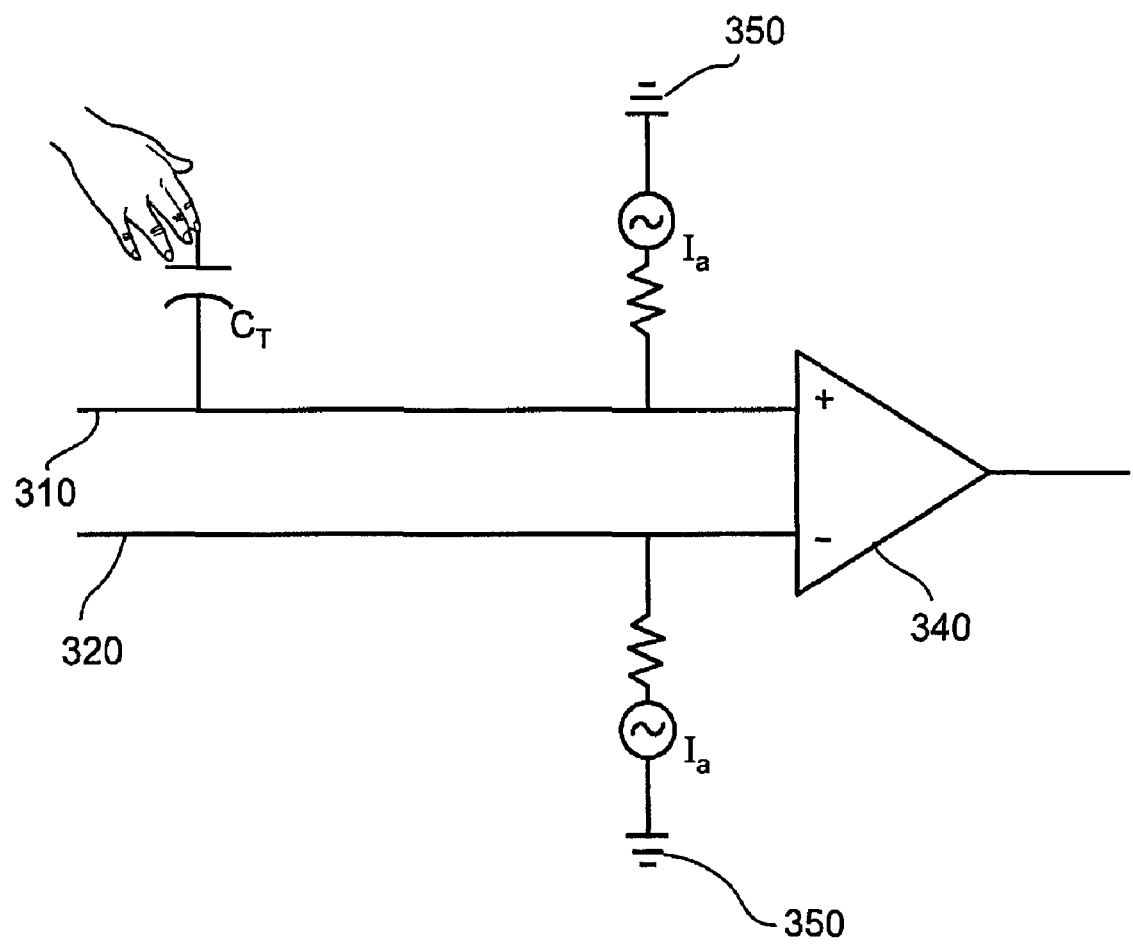
FIG. 2 is an exemplary simplified circuit diagram for touch detection according to some embodiments of the present invention.

Reference is now made to FIG. 2 showing an exemplary circuit diagram for touch detection according to some embodiments of the present invention. Conductive lines 310 and 320 are parallel non-adjacent lines of sensor 12. According to some embodiments of the present invention, conductive lines 310 and 320 are interrogated to determine if there is a finger. To query the pair conductive lines, a signal source $I_a$, e.g. an AC signal source induces an oscillating signal in the pair. Signals are referenced to a common ground 350. When a finger is placed on one of the conductive lines of the pair, a capacitance, $C_T$, develops between the finger and conductive line 310. As there is a potential between the conductive line 310 and the user's finger, current passes from the conductive line 310 through the finger to ground. Consequently a potential difference is created between conductive line 310 and its pair 320, both of which serve as input to differential amplifier 340.

Figure 3:
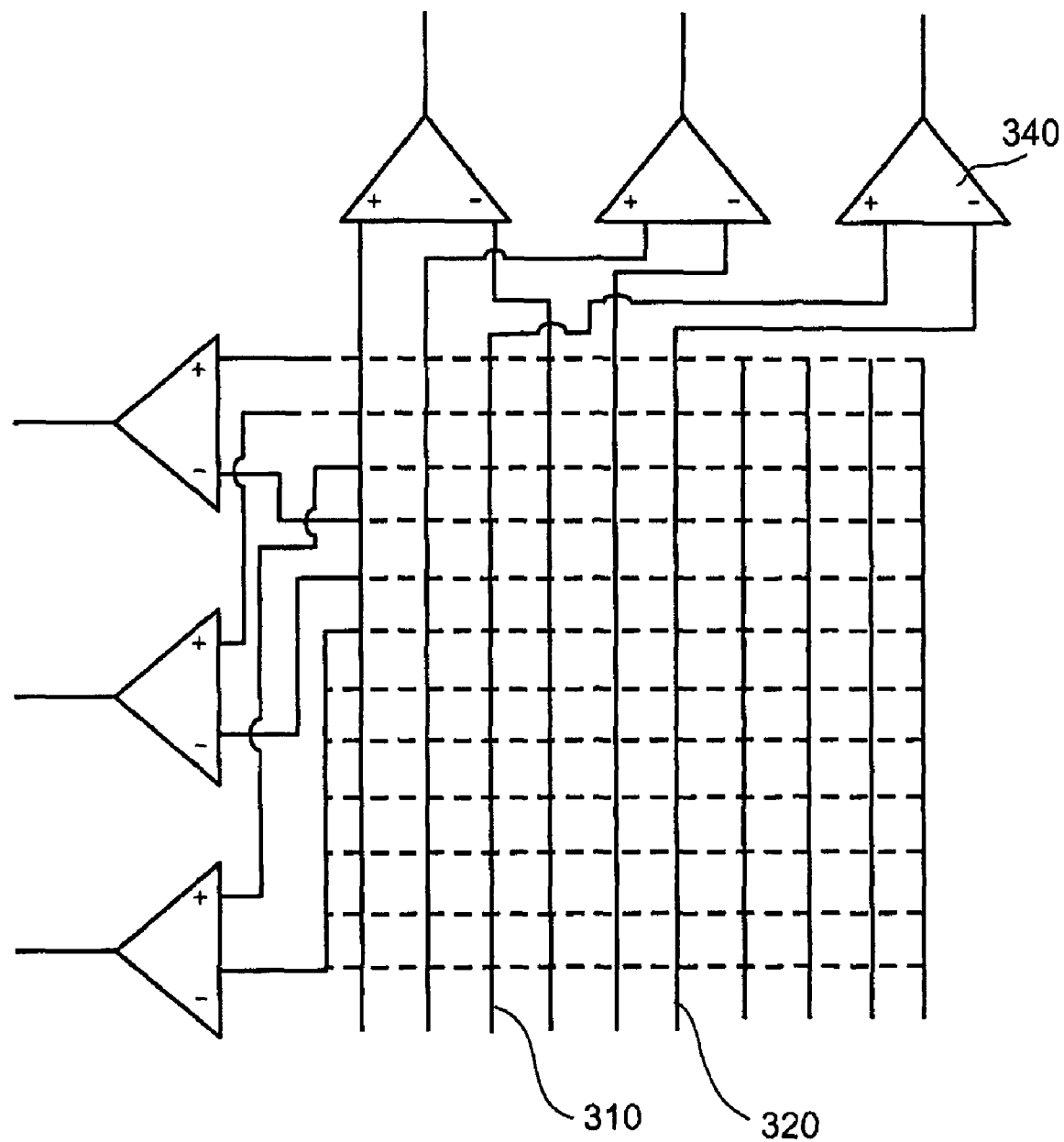
FIG. 3 is an exemplary simplified circuit diagram of a digitizer sensor including differential amplifiers according to embodiments of the present invention.

Reference is now made to FIG. 3 showing an array of conductive lines of the digitizer sensor as input to differential amplifiers according to embodiments of the present invention. Separation between the two conductors 310 and 320 is typically greater than the width of the finger so that the necessary potential difference can be formed, e.g. approximately 12 mm or 8 mm-30 mm. The differential amplifier 340 amplifies the potential difference developed between conductive lines 310 and 320 and ASIC 16 together with digital unit 20 processes the amplified signal and thereby determine the location of the user's finger based on the amplitude and/or signal level of the sensed signal. In one example, the location of the user's finger is determined by examining the phase of the output. In another example, since a finger touch typically produces output in more than one conductive line, the location of the user's finger is determined by examining outputs of neighboring amplifiers. In yet other examples, a combination of both methods may be implemented. According to some embodiments, digital processing unit 20 is operative to control an AC signal provided to conductive lines of sensor 12, e.g. conductive lines 310 and 320. Typically a fingertip touch on the sensor may span 2-8 lines, e.g. 6 conductive lines and/or 4 differential amplifier outputs. Typically, the finger is placed over a number of conductive lines so as to generate an output signal in more than one differential amplifier, e.g. a plurality of differential amplifier's. However, a fingertip touch may be detected when placed over one conductive line.

Figure 4:
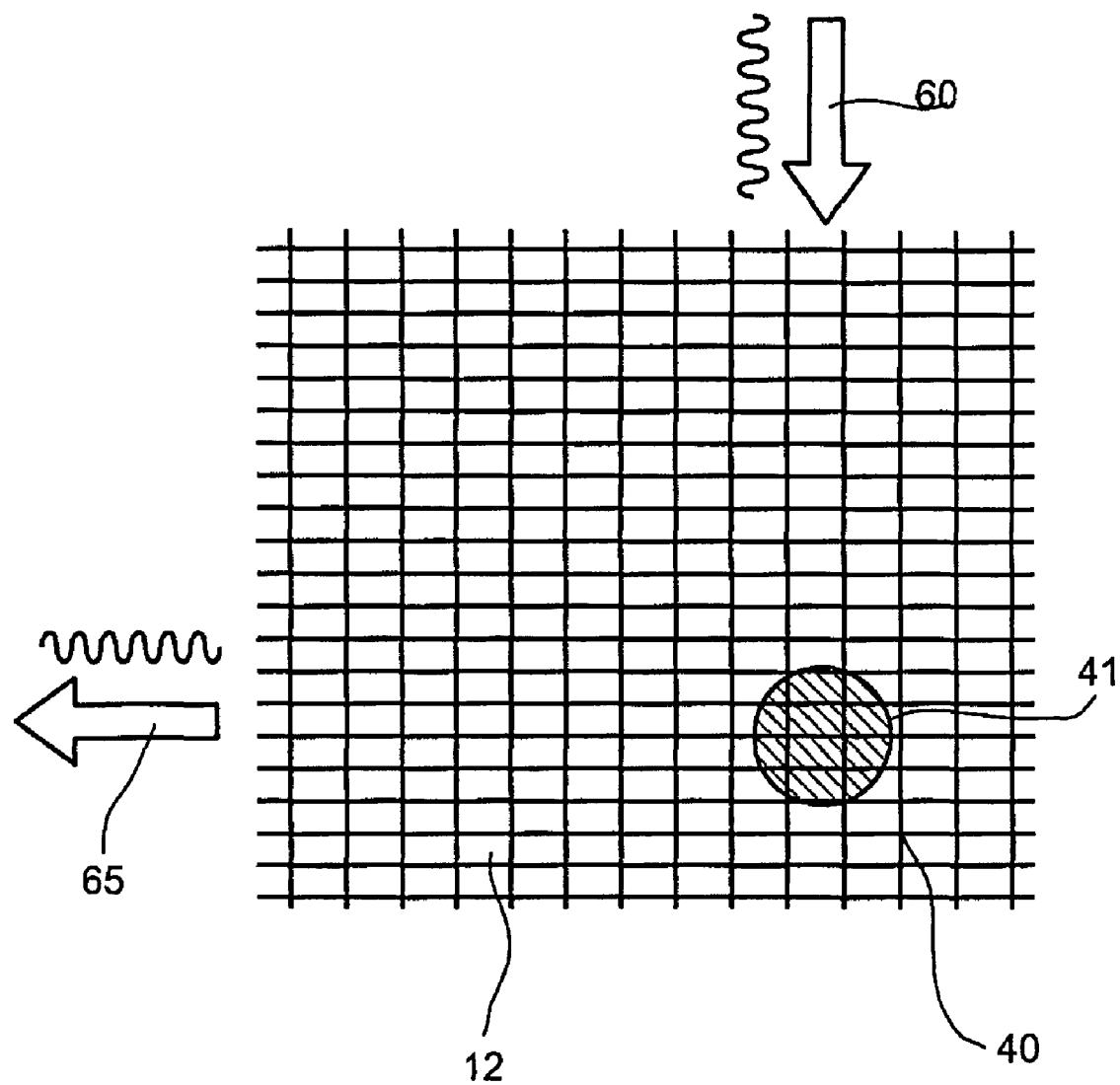
FIG. 4 is a schematic illustration of a digitizer sensor for fingertip touch detection based on a capacitive touch method for detecting fingertip touch according to some embodiments of the present invention.

Reference is now made to FIG. 4 which schematically illustrates a capacitive touch method for fingertip touch detection using a digitizer sensor, according to some embodiments of the present invention. At each junction, e.g. junction 40 in sensor 12 a certain minimal amount of capacitance exists between orthogonal conductive lines. In an exemplary embodiment, an AC signal 60 is applied to one or more parallel conductive lines in the two-dimensional sensor matrix 12. When a finger 41 touches the sensor at a certain position where signal 60 is induced, the capacitance between the conductive line through which signal 60 is applied and the corresponding orthogonal conductive lines at least proximal to the touch position increases and signal 60 crosses by virtue of the capacitance of finger 41 to corresponding orthogonal conductive lines to produce and an output signal 65. This method is able to detect more than one finger touch at the same time (multi-touch). This method further enables calculating touch area. In exemplary embodiments of the present invention, each conductive line is input to an amplifier. Optionally, each line is input to a differential amplifier, while the other input to the amplifier is ground. Typically, the presence of a finger decreases the coupled signal by 20-30% since the fingerer typically drains current from the lines.

The present invention is not limited to the technical description of the digitizer system described herein. Digitizer systems used to detect stylus and/or fingertip location may be, for example, similar to digitizer systems described in incorporated U.S. Pat. No. 6,690,156, U.S. Patent Application Publication No. 20040095333 and/or U.S. Patent Application Publication No. 20040155871. It will also be applicable to other digitized systems known in the art, depending on their construction.

Figure 5A:
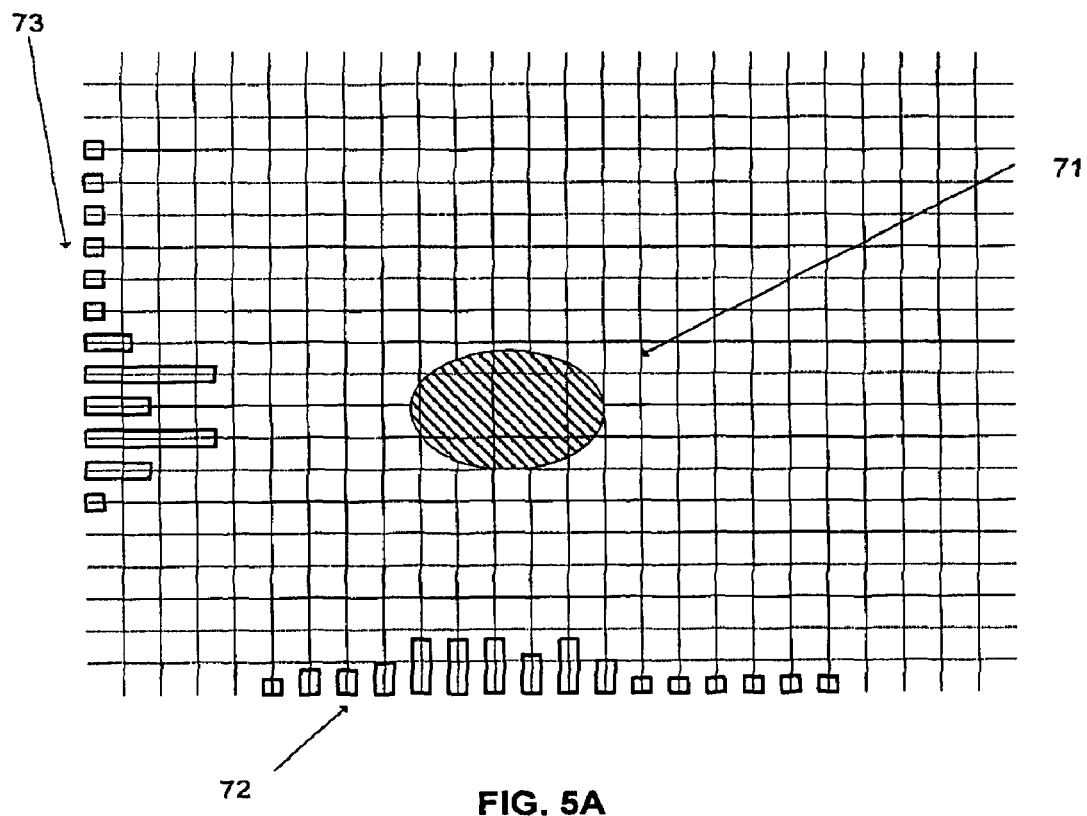
FIG. 5A is a schematic illustration of an exemplary signal pattern of signal amplitudes obtained from fingertip touch detection according to some embodiments of the present invention.
Figure 5B:
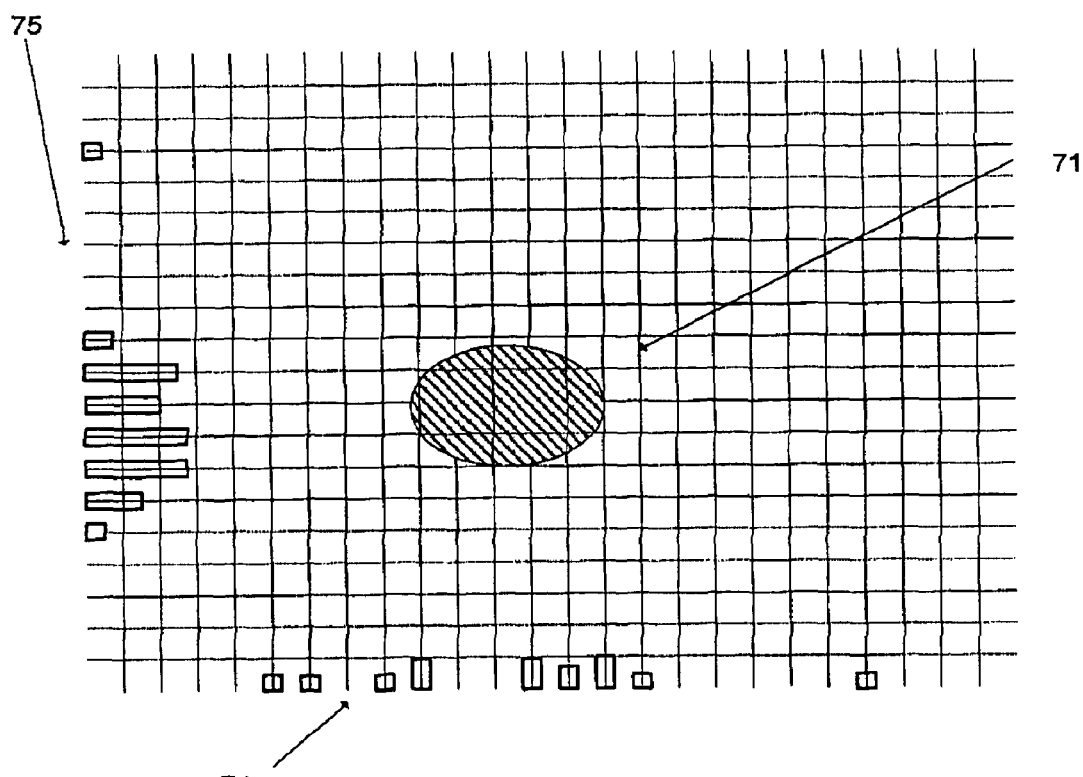
FIG. 5B is a schematic illustration of an exemplary signal pattern of signal amplitude gradients obtained from fingertip touch detection according to some embodiments of the present invention.

According to some embodiments of the present invention, patterns of signal amplitudes and patterns of signal amplitude gradients are detected and used to verify that a signal input to a digitizer is a fingertip touch input and/or that signal detection is fingertip touch detection. Reference is now made to FIG. 5A showing an exemplary signal pattern of signal amplitude outputs from a differential amplifier obtained from a fingertip touch and to FIG. 5B showing an exemplary signal pattern of signal amplitude gradients obtained from a fingertip touch according to some embodiments of the present invention. The present inventors have found signal patterns that are typical of fingertip touch and that thus it is possible to differentiate between fingerertip touch and other detected signals on the digitizer, e.g. due to a hand resting on the digitizer, mechanical changes between the digitizer and the LCD.

In FIG. 5A, an area 71 over which a fingertip touches the digitizer sensor induces a plurality of signals on the vertical and horizontal conductive lines of the digitizer sensor. The amplitude of the detected signals sensed from the horizontal conductive lines are represented by bars 73 and the amplitude of the detected signals sensed from the horizontal conductive lines are represented by bars 72. In some exemplary embodiments, signals are detected on conductive lines area 71 as well as in neighboring conductive lines. Typically, the signals induced in the neighboring conductive lines occur due to mechanical changes of the sensor and the LCD when the fingertip presses down the digitizer sensor and LCD screen. In some exemplary embodiments, only amplitudes above a pre-defined level are considered.

In FIG. 5B, the gradient signal amplitude gradients are defined as the absolute values of the differences of amplitudes sensed on two neighboring conductive lines. Optionally the gradient is divided by the distance between the neighboring conductive lines. In some exemplary embodiments, only gradients above pre-defined level are considered. Other known methods of representing a gradient in a signal may be implemented and used to verify fingertip touch.

Typically, fingertip touch may be characterized by relatively high signal amplitudes in a centralized portion of the detected touch area that taper down toward the peripheral area. Typically, gradient values can be expected to be relatively high near the peripheral area of the detected touch. When using a digitizer system where pairs of conductive lines are input to a differential amplifier, approximately zero detection and/or "null" output may occur in signal detection due to the pair of conductive lines which are input to the same differential amplifier being touched simultaneously and/or during the same touch event so that both inputs are equally reduced by the touch. A "null" output may result in either a substantially zero output signal and/or a relatively low output signal. This typically occurs with hand touch that may span over a relatively large area, but may also occur during finger tip touch. Embodiments of the present invention, take into account the expected frequency of approximately zero detection to differentiate between large area touch, e.g. hand touch and fingertip touch. According to embodiments of the present invention, fingertip touch detection and/or verification are determined based on amplitude variations and gradient variations of the digitizer sensor output.

Figure 6:
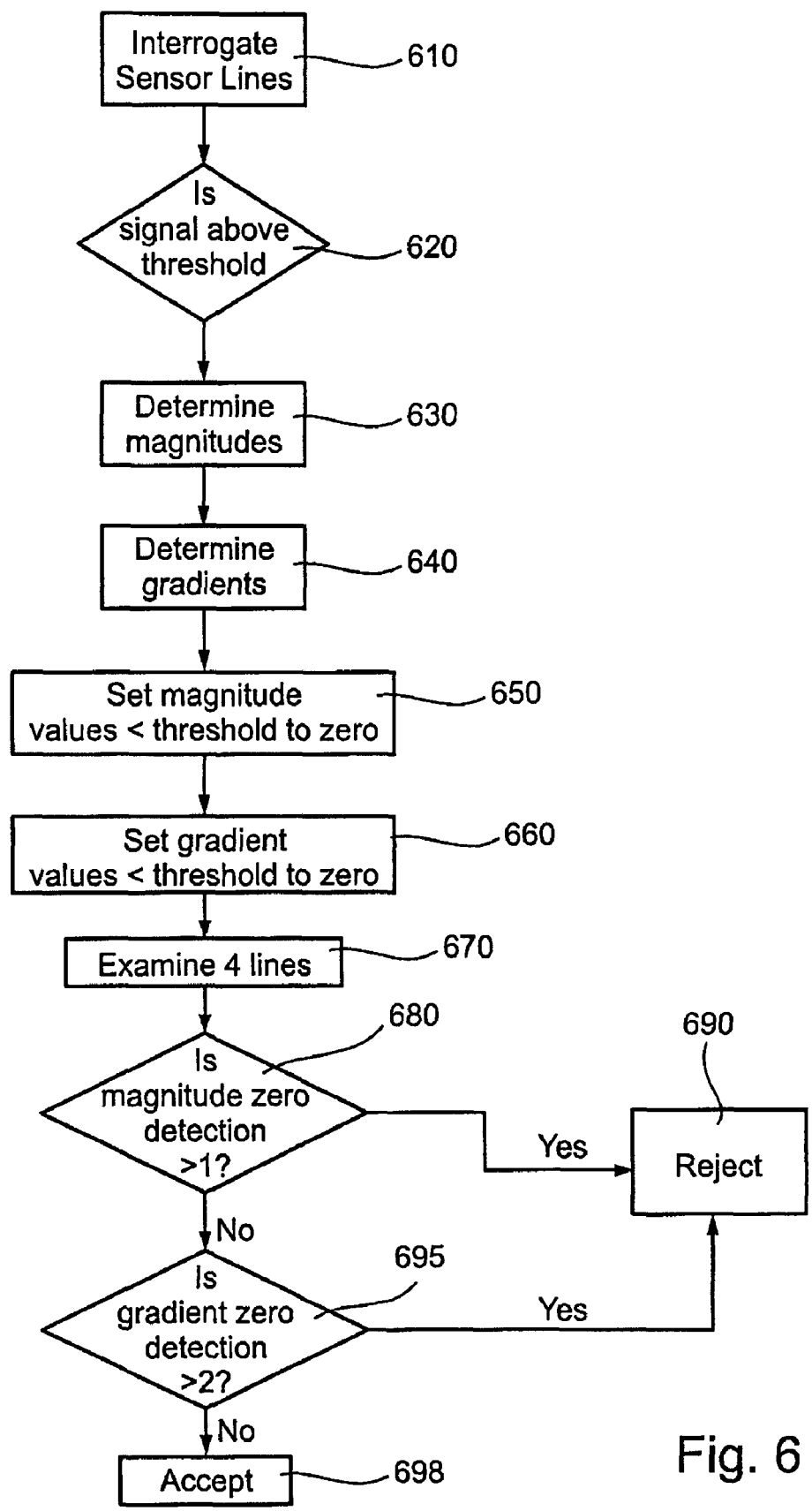
FIG. 6 is an exemplary flow chart describing a method for verifying that signal detection on a digitizer is fingertip touch detection according to an exemplary embodiment of the present invention.

Reference is now made to FIG. 6 which shows a flow chart of a method for verifying that a signal input to a digitizer is a signal input derived from a fingertip touch according to an exemplary embodiment of the present invention. According to some embodiments of the present invention, conductive lines of the sensor are interrogated to detect a signal in at least one of the conductive lines of the sensor (block 610). In exemplary embodiments, conductive lines in both the vertical and horizontal direction are interrogated. In other exemplary embodiments, conductive lines in one of the two directions are interrogated, e.g. the horizontal direction and/or a direction where a maximum number of conductive lines are expected to be affected. Alternatively, a direction were a minimum number of conductive lines are expected to be affected may be interrogated. When at least one conductive line is determined to have a signal amplitude above the pre-defined event threshold, fingertip verification is performed (block 620). In one exemplary embodiment, fingertip verification is performed when at least one conductive line in each of the horizontal and vertical directions is determined to be above the pre-defined event threshold. In another exemplary embodiment, fingertip verification is performed when at least one conductive line in either the horizontal or vertical direction is determined to be above the pre-defined event threshold. In yet another exemplary embodiment, fingertip verification is performed when at least one conductive line in a specified direction is determined to be above the pre-defined event threshold. In some exemplary embodiments, fingertip verification is performed when at least one conductive line in each axis is determined to be above the pre-defined event threshold. In some exemplary embodiments, the pre-defined event threshold is identical in both directions. In other exemplary embodiments, the pre-defined event threshold is different in each of the directions.

A pattern and/or distribution of signal amplitudes detected on conductive lines in the vicinity of the at least one conductive line carrying a signal above the pre-defined event threshold is determined and optionally saved (block 630). In some exemplary embodiments the number of conductive lines of the distribution examined is limited by a pre-determined number of conductive lines on each side of the at least one conductive line carrying a signal above the pre-defined event threshold. In other exemplary embodiments, all the conductive lines are included in the determined distribution. In some embodiments of the present invention, all the conductive lines are examined in a group-wise fashion using a moving or sliding window. For example, 4 conductive lines are examined subsequently another 4 conductive lines are examined including 3 conductive lines from the first group plus one new conductive line adjacent to the three, etc. In one exemplary embodiment, all the conductive lines of the sensor are scanned and/or interrogated in each axes, and when detecting an output, e.g. amplifier output, above a threshold, the next several amplifier outputs are also examined. In an example, the next three outputs are examined.

Gradient measurements of the distribution of signal amplitudes are determined and optionally saved (block 640). Determined amplitude values below a pre-defined amplitude threshold are set to a value of zero (block 650). Typically, the pre-defined amplitude threshold in block 650 is lower than the event threshold in block 620. Determined gradient values below a pre-defined gradient threshold are set to a value of zero (block 660). In one exemplary embodiment, the amplitude threshold is equal in value the gradient threshold. According to some embodiments of the present invention, the signal pattern obtained is used to verify that a detected touch event is a fingertip touch event.

In some exemplary embodiments of the present invention, a group of conductive lines are examined each time, e.g. output from differential amplifiers (block 670). If a pre-defined number of conductive lines from the group have zero amplitude (e.g., below some threshold), e.g. 1 out of 4 conductive lines (block 680), it is determined that the detected pattern is not a fingertip pattern (block 690). If a pre-defined number of conductive lines from the group of gradient measurements are at near zero amplitude, e.g. 3 out of 4 conductive lines or more than 2 conductive lines (block 695), it is determined that the detected pattern is not a fingertip pattern (block 690). If less then the pre-defined number of lines are at zero amplitude, a fingertip touch pattern is detected (block 698). After examining a first set of conductive lines, examination of a subsequent set of conductive lines is examined, e.g. in shifts of one conductive line and/or in shifts of the group size examined. This process is continued until, for example, fingertip touch is detected, until no signals in the set are detected, or until all the conductive lines are examined. According to some embodiments of the present invention, both amplitude patterns and gradient patterns are examined and are required to satisfy the defined conditions in order to verify a fingertip touch. According to other embodiments of the present invention, either amplitude patterns or gradient patterns are examined and used to verify a fingertip touch. Other methods of examining the distribution of signal amplitudes and signal amplitude gradients to determine if an input signal is obtained from a fingertip touch may be used.

Figure 7A:
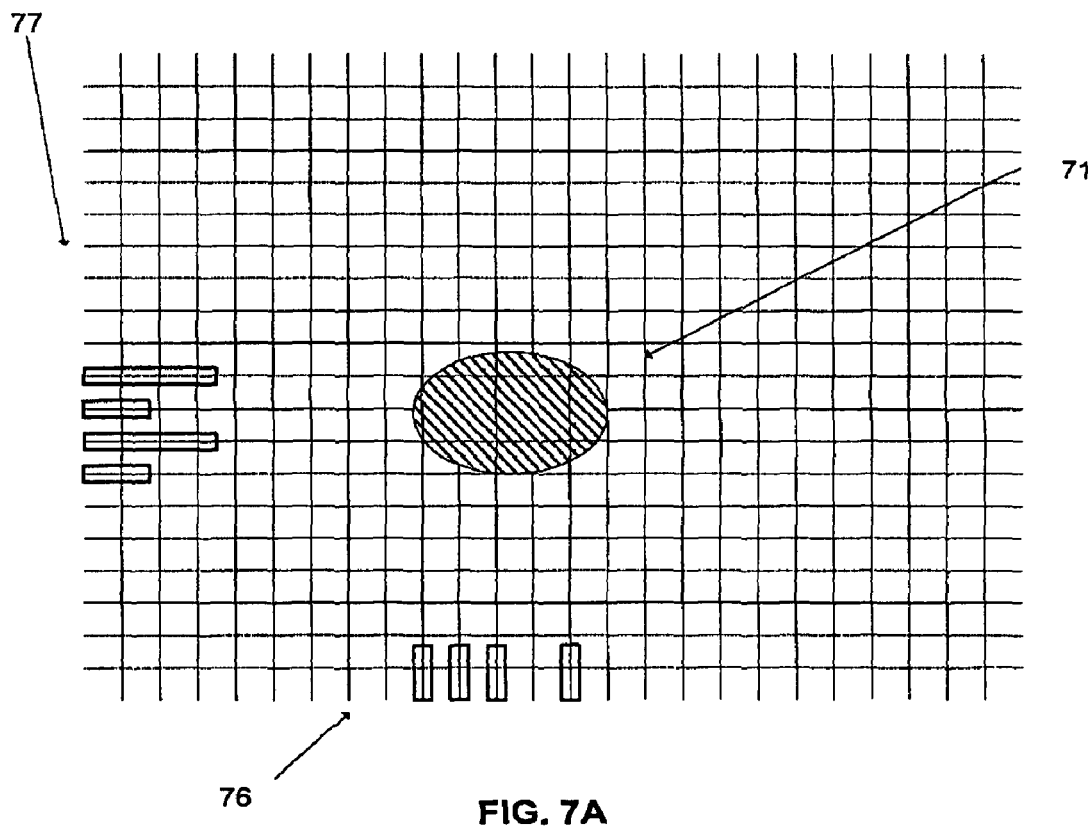
FIG. 7A is a schematic illustration of an exemplary signal pattern for fingertip touch showing a pattern of amplitude values above a pre-defined amplitude threshold according to an exemplary embodiment of the present invention.
Figure 7B:
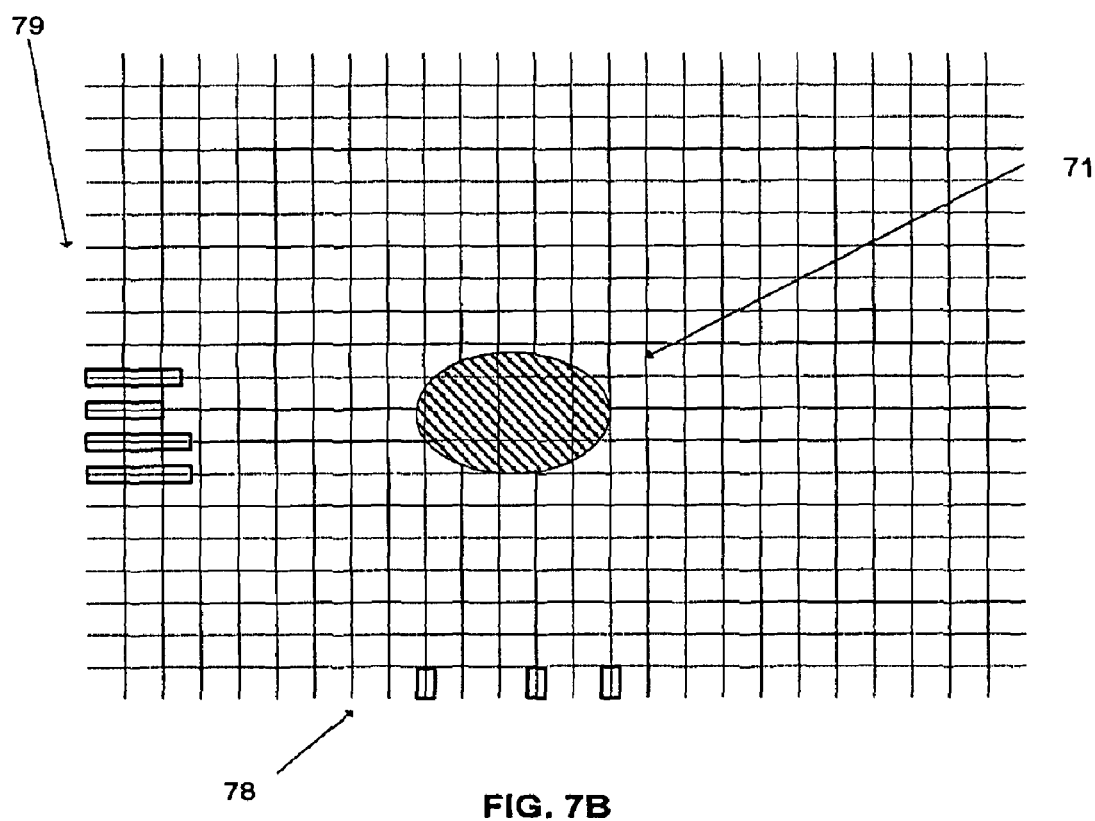
FIG. 7B is a schematic illustration of an exemplary signal pattern for fingertip touch showing a pattern of gradient values above a pre-defined gradient threshold according to an exemplary embodiment of the present invention.

Reference is now made to FIG. 7A showing an exemplary fingertip signal pattern showing a pattern of amplitude values above a amplitude threshold and to FIG. 7B showing an exemplary fingertip signal pattern showing a pattern of gradients of amplitude values where the gradients are above a gradient threshold according to some embodiments of the present invention. FIGS. 7A and 7B correspond to the pre-threshold values shown in FIGS. 5A and 5B. In FIG. 7A, a signal detected in area 71 resulted in four consecutive conductive lines 77 that were found to carry a signal above an amplitude threshold in the vertical directions and four non-consecutive conductive lines 76 were found to carry a signal above an amplitude threshold in the horizontal direction. In the horizontal direction there was one conductive line with a zero reading between the four conductive lines that were found to carry a signal above amplitude threshold. As such, according to some embodiments of the present invention, the amplitude pattern shown in FIG. 7A qualifies for fingertip touch.

In the exemplary pattern of FIG. 7B, a signal detected in area 71 resulted in four consecutive conductive lines 79 that were found to carry a gradient signal above a gradient threshold in the vertical directions and three non-consecutive conductive lines 78 were found to carry a signal above a gradient threshold in the horizontal direction. In the horizontal direction there was a space of two conductive lines with a zero reading between the three conductive lines that were found to carry a signal above a gradient threshold. Since only two spaces were found in the gradient pattern, the pattern shown in FIG. 7B qualifies for fingertip touch. According to some embodiments of the present invention, the pattern shown in FIG. 7A together with the pattern shown in FIG. 7B is used as verification that the input signal 71 is a fingertip touch input signal. Since only a small window is examined each time, e.g. a window including output from 4 adjacent parallel lines, one or more simultaneous finger touches can be detected using the method described above. The patterns shown in FIGS. 5A, 5B, 7A and 7B are only exemplary patterns; other patterns may qualify for fingertip touch verification, using other defined limits to the number of spacing between signal readings.

Reference is now made to FIG. 8A, 8B, 8C and 8D showing an exemplary signal pattern for hand touch of signal amplitudes, signal amplitude gradients, signal amplitudes for which the amplitude is above a pre-defined amplitude threshold, and signal amplitude gradients in which the gradient amplitude is above a pre-defined gradient threshold respectively according to embodiments of the present invention. According to embodiments of the present invention, hand input signal 81 may induce a pattern and/or distribution of signal amplitudes in the vertical direction 83 and in the horizontal direction 82. In some exemplary embodiments, signals are detected on conductive lines in area 81 as well as in neighboring conductive lines. Typically, the signals induced in the neighboring conductive lines occur due to mechanical changes of the sensor and the LCD when the fingertip presses down the digitizer sensor and LCD screen.

Typically, the affected area of a hand touch is larger than the affected area of a fingertip touch and therefore more differential amplifier "null" outputs may occur. Actually, the differences are usually much larger than shown in FIGS. 7 and 8. In addition, in hand touch contact may be emphasized in the peripheral area of the hand while in fingertip touch contact may be focused more in the central portion of the finger and/or evenly distributed. As such one or more conductive lines corresponding to area 81 may read a relatively low and/or zero value. In some exemplary embodiments, relatively low and/or zero value readings occur since the outputs are differential amplifier outputs and the signals on the differential inputs are nearly the same.

Figure 8A:
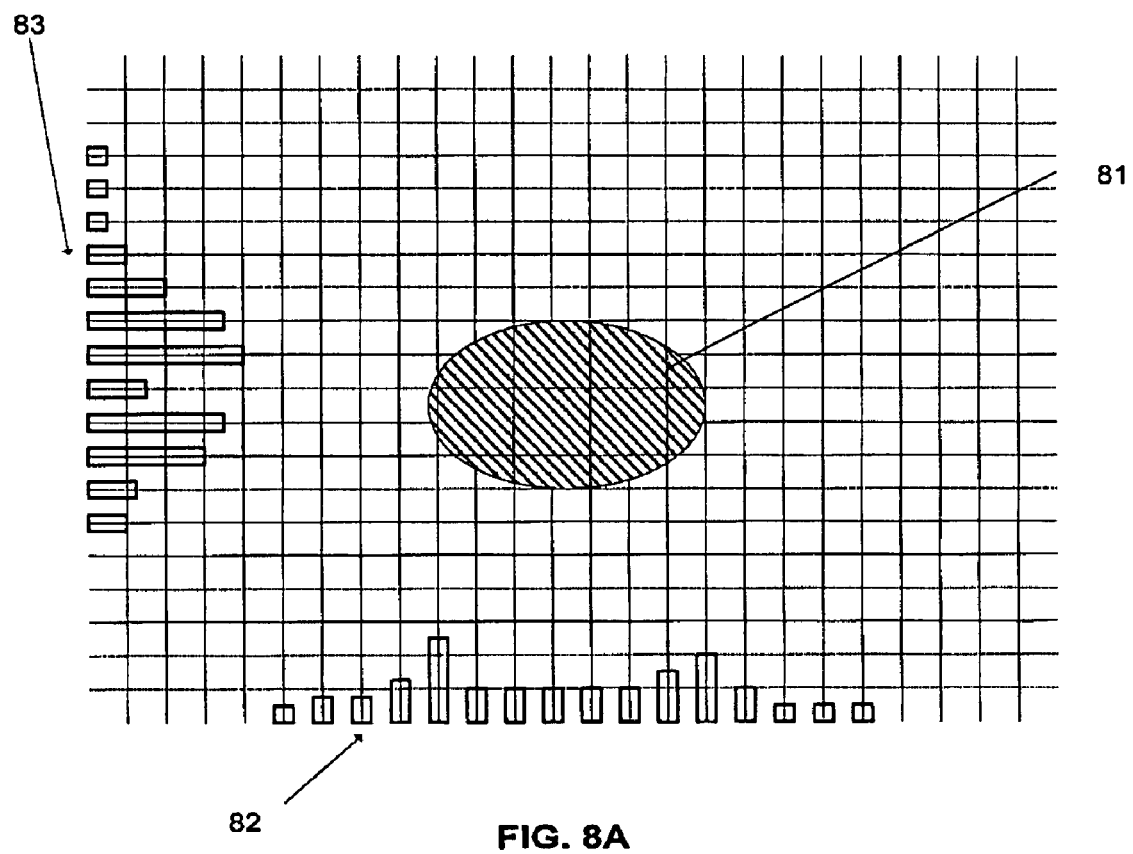
FIG. 8A is a schematic illustration of an exemplary signal pattern of signal amplitudes obtained from hand touch detection according to some embodiments of the present invention.
Figure 8B:
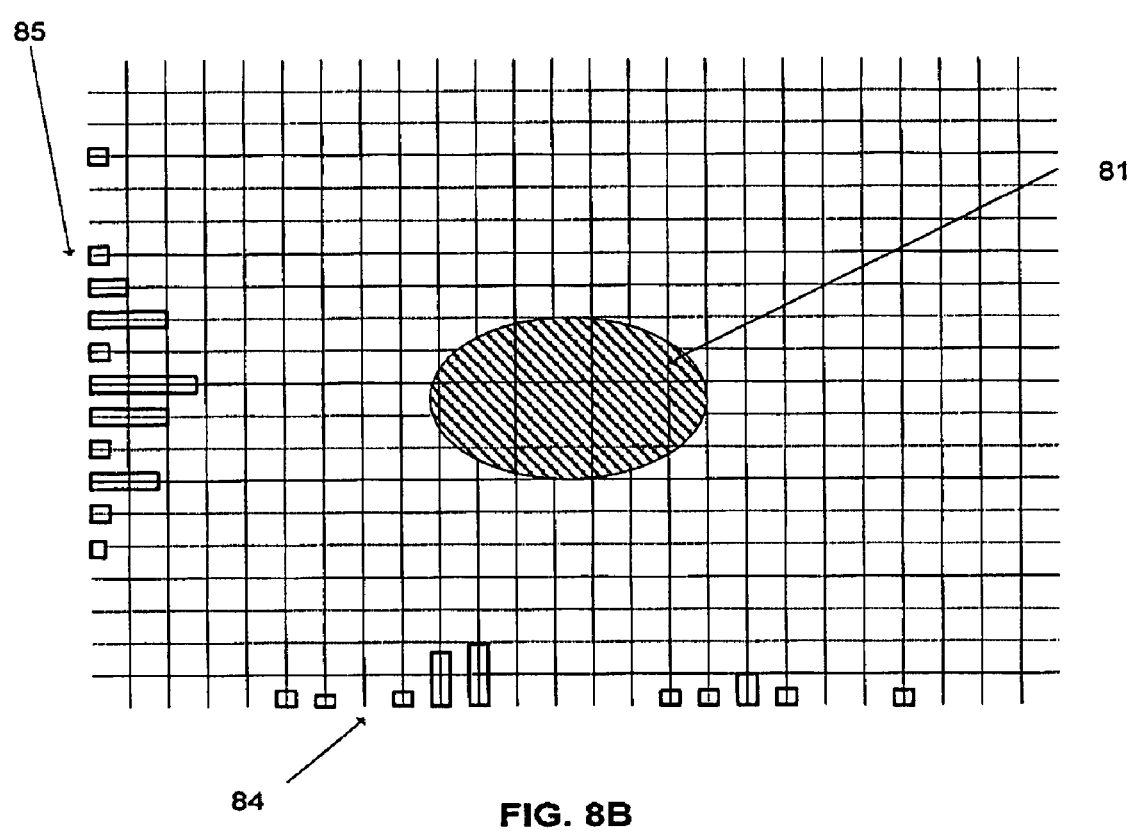
FIG. 8B is a schematic illustration of an exemplary signal pattern of signal amplitude gradients obtained from hand touch detection according to some embodiments of the present invention.
Figure 8C:
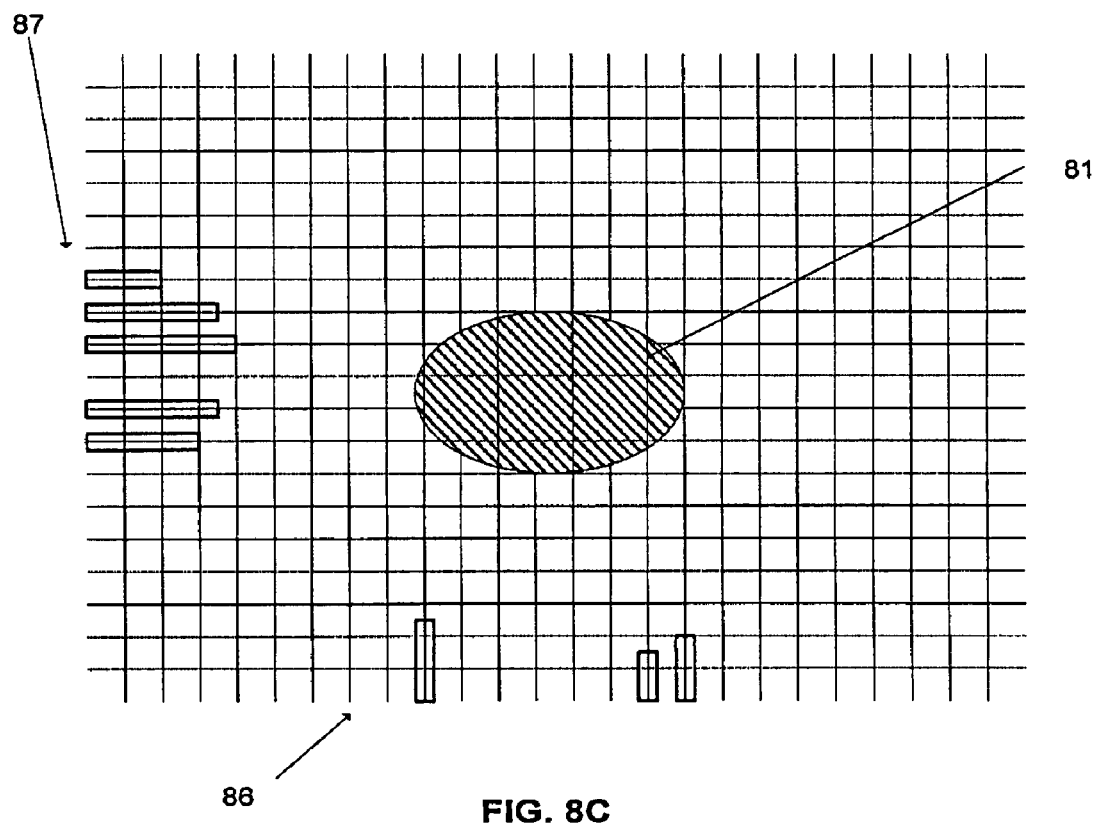
FIG. 8C is a schematic illustration of an exemplary signal pattern of hand touch detection showing a pattern of amplitude values above a pre-defined amplitude threshold according to some embodiments of the present invention.
Figure 8D:
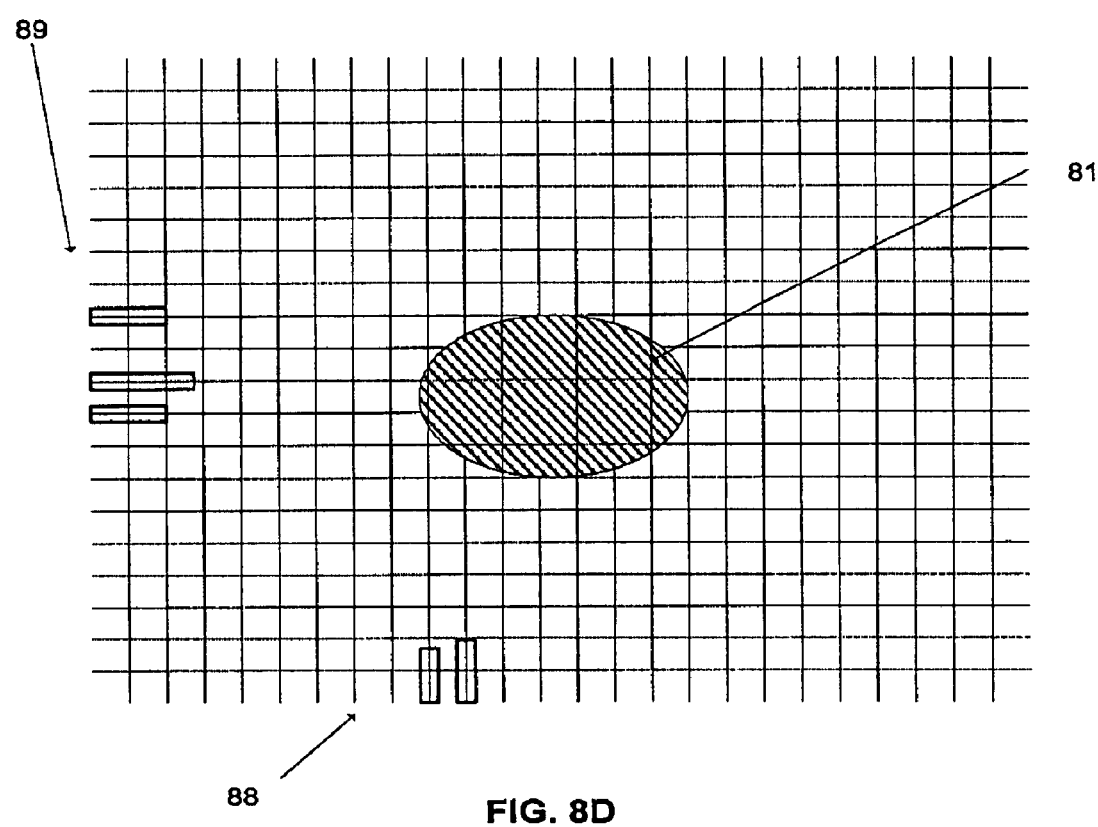
FIG. 8D is a schematic illustration of an exemplary signal pattern of hand touch detection showing a pattern of gradient values above a pre-defined gradient threshold according to an exemplary embodiment of the present invention.

This relative uniformity of signals may also be reflected in the gradient pattern 84 and 85 of the detected signal, showing low and/or zero gradient values corresponding to gradients corresponding to the central portion of area 81. When examining FIG. 8C and 8D, zero reading corresponding to a central portion of area 81 is clearly shown in the horizontal direction, e.g. signals 86 and 88 although less so in the vertical directions, e.g. signals 87 and 89. In other examples, the opposite may be true. The method described herein and in FIG. 6, will reject the pattern displayed in FIGS. 8A-8D as a non-fingertip touch pattern due to the spacing between the signal values shown in FIGS. 8C and 8D, e.g. greater than 1 space in amplitude values above amplitude threshold (FIG. 8C) and greater than two spaces in gradient values above a gradient threshold (FIG. 8D). Typically, when a signal is rejected, "no touch" data is reported to the host computer. According to some embodiments of the present invention, methods described herein are used for palm rejection. The necessity of palm rejection arises from the convenience (and ease) of placing the hand of a user over the sensor while using the stylus and/or finger and not intending this type of touch to be interpreted as a user interaction.

The method described herein above can be applied to different types of digitizer sensors, e.g. digitizer sensors described in both FIG. 3 and FIG. 4 of the present invention. In an exemplary embodiment, when applying the digitizer sensor described in FIG. 4 such that each conductive line is associated with and/or connected to a single amplifier, the number of spaces tolerated in the amplitude pattern, e.g. amplitude pattern shown in FIG. 7A, before rejecting an input signal, can be reduced, e.g. reduced to zero. As such any space between neighboring amplitude readings and/or any zero detection occurring within the examined window corresponds to an area detected as a non-fingertip touch input. In systems in which differential signals are determined (e.g. as described in FIG. 2), zero detection is tolerated by a threshold amount to account for cases when both conductive lines of a differential amplifier may be included in the induced area, e.g. producing zero detection. For systems that do not record differential signals between conductive lines, this consideration is not relevant.

Figure 9:
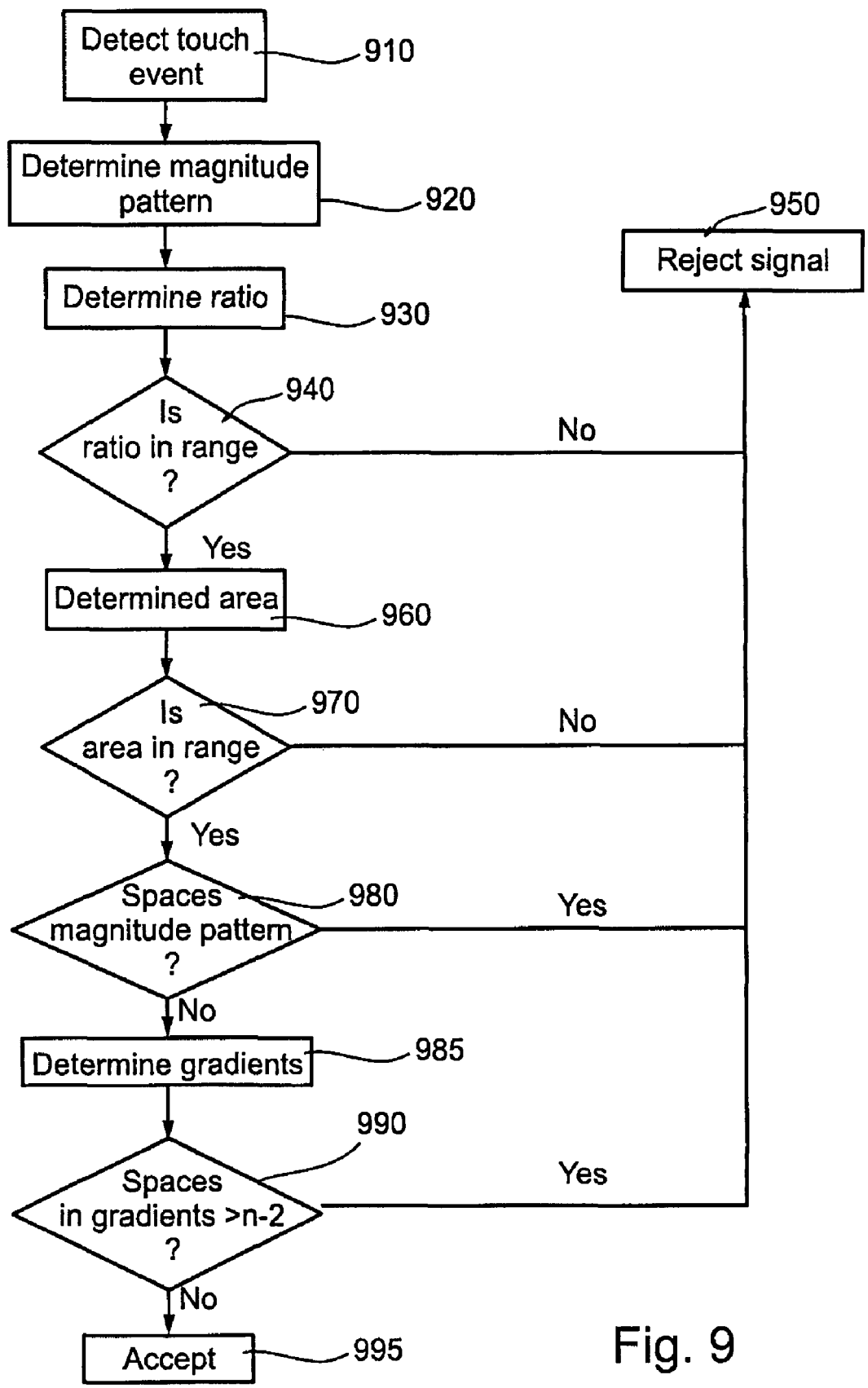
FIG. 9 is an exemplary flow chart describing a method for verifying that signal detection on a digitizer is fingertip touch detection according to other exemplary embodiment of the present invention.

Reference is now made to FIG. 9 showing an exemplary flow chart describing a method for verifying that a signal input to a digitizer is a fingertip touch input signal according to another exemplary embodiment of the present invention. Typically, the method described with reference to FIG. 9 is used with the touch detection method described with reference to FIG. 4. According to some embodiments of the present invention, the shape of the signal input area is estimated and considered when that signal detection corresponds to fingerertip touch. According to some embodiments of the present invention, the presence of a touch event is identified by detecting at least one conductive line with a signal reading with absolute amplitude above a pre-defined event threshold level (block 910). The amplitude values of signals detected on conductive lines of the sensor are determined (block 920). In some exemplary embodiments, a pattern of amplitude values are determined in a defined area around the conductive line with a signal reading above the event threshold. In other exemplary embodiments, all conductive lines are interrogated to determine a pattern of amplitude values. In some embodiments of the present invention, an amplitude value below a pre-defined amplitude threshold is set to zero detection.

According to some embodiments of the present invention, a ratio between the numbers of conductive lines with a detected signal above the pre-defined amplitude threshold found in each of the orthogonal axes is determined (block 930). In one exemplary embodiment, a shape scale is determined that is a ratio of the number of conductive lines in the long axis over number of detected lines in the short axis of the touch area. A query is performed to determine if the ratio is in a pre-defined range (block 940). In some exemplary embodiments, finger touch input corresponds to a ratio of approximately 1:1 or 2:1. Optionally a signal corresponding to a ratio outside of this range is rejected as non-finger pattern. According to some embodiments of the present invention, an area of the input signal is determined (block 960). In one exemplary embodiment, the area of the input signal is approximated as a rectangle and is determined based on the length of the input signal on each of the orthogonal axes of the sensor. The length is approximated by multiplying the number of conductive lines including a detected signal, e.g. above an amplitude threshold, by the spacing between the conductive lines. A query to determine if the calculated area is within a specified range that corresponds to fingerertip touch is made (block 970). According to some embodiments of the present invention, a detected area in the range of approximately 16 mm² to 500 mm² is considered a range that corresponds to a fingertip touch. Detected ranges outside of this defined range are rejected as a non-fingertip signal (block 950). In one exemplary embodiment, area determination is determined prior to the ratio determination. In another exemplary embodiment, one of either the ratio determination and/or the area determination is implemented as opposed to both. According to some embodiments of the present invention, a query is made to determine windows of examined areas including spaces (block 980). If a window without any spaces is found, a detected signal qualifies for being defined as a fingertip signal, otherwise the signal is rejected. The gradient pattern is determined (block 985). Gradient value is the difference between signal amplitudes detected on adjacent and/or neighboring conductive lines. In one exemplary embodiment, for example for grids with conductive lines that are not evenly spaced, the gradient value determined is divided by the distance between the adjacent conductive lines. In some exemplary embodiments, only gradient values above a gradient threshold is considered and other gradient values are set to zero. Optionally the gradient threshold and the amplitude threshold have the same value. The number of conductive lines, N, from which a signal was detected is determined. If more than N-2 spaces in the gradient signal are determined, the input signal is rejected (block 990). Typically, when examining the gradient image, a signal is detected on the edges, e.g. the contour of the image, therefore N-2 spaces. Otherwise, the input signal is verified as a fingertip input signal and is accepted (block 995). In other embodiments of the present inventions, one or more blocks may be omitted and/or the order of the blocks may be rearranged.

According to some embodiments of the present invention, a spatial high pass filter is used to determine a gradient pattern of the input signal. Since a spatial high pass filter only passes high frequency signals, regions with large changes in signal amplitude will be detected. Typically these regions correspond to the edges of the finger touch detected area and therefore the output of the high pass filter results in a contour variation with large relative changes.

The sensitivity of the methods described herein for verifying that a detected signal on a digitizer sensor is a fingertip touch may be a function of several parameters, and the parameters and there threshold values may be application specific. The different parameters include threshold values for signal amplitudes and threshold for 'touch event', threshold values for signal amplitude gradients, defined ratio range between the detected signal on the orthogonal conductive lines of the sensor, defined area of the input signal, cutoff frequency of the high-pass filter, and number of examined antennas. One or more of the parameters described to verify that a detected signal on a digitizer sensor corresponds to a fingertip touch may be used in combination with other parameters or on its own.

According to some embodiments of the present invention, the methods described herein can be used to differentiate between stylus input, fingertip input and other user input. According to some embodiments of the present invention, some of methods described herein may be performed on host computer 22, on digital unit 20 and/or on ASIC unit 16.

The term pattern herein does not refer to the mere area on the digitizer sensor over which a signal is detected.

It should be further understood that the individual features described hereinabove can be combined in all possible combinations and sub-combinations to produce exemplary embodiments of the invention. Furthermore, not all elements described for each embodiment are essential. In many cases such elements are described so as to describe a best more for carrying out the invention or to form a logical bridge between the essential elements. The examples given above are exemplary in nature and are not intended to limit the scope of the invention which is defined solely by the following claims.

The terms "include", "comprise" and "have" and their conjugates as used herein mean "including but not necessarily limited to".

The invention claimed is:

1. A method for verifying a fingertip touch input to a digitizer, the method comprising:
   obtaining a spatial pattern of signal amplitudes from input provided over a plurality of conductive lines of a digitizer sensor;
   detecting gradients within the spatial pattern of signal amplitudes;
   determining a number of conductive lines associated with a spatial gradient below a pre-defined gradient threshold; and
   recognizing a fingertip touch input in response to the number of conductive lines determined being below a pre-defined number.

2. The method according to claim 1, wherein the conductive lines include two orthogonal sets of parallel conductive lines forming a grid.

3. The method according to claim 2, wherein pairs of the parallel conductive lines are input to differential amplifiers, and wherein the pattern of signal amplitudes is a pattern of differential amplifier outputs.

4. The method according to claim 3, wherein the pairs of the parallel conductive lines are non-adjacent conductive lines.

5. The method of claim 2, wherein the spatial pattern of signal amplitudes is a spatial pattern formed in each of the two orthogonal sets of parallel conductive lines.

6. The method according to claim 1, wherein the spatial pattern is a spatial pattern of signal amplitudes above a pre-defined amplitude threshold.

7. The method according to claim 1, comprising comparing a spatial pattern of the gradients to a pre-determined fingertip characteristic.

8. The method according to claim 1, wherein the pattern of signal amplitudes is detected using a capacitive touch method.

9. The method according to claim 8 comprising:
   determining a ratio of dimensions of an area from which input to the digitizer sensor is detected; and
   defining a range of the ratio that qualifies for verifying fingertip touch.

10. The method according to claim 9 comprising:
    determining an area from which a signal on the digitizer sensor is detected; and
    determining a range of the area that qualifies for verifying fingertip touch.

11. The method according to claim 1, further comprising determining a contour from the spatial pattern.

12. The method according to claim 1, wherein the detecting includes detecting multi-touch.

13. The method according to claim 1, wherein recognizing the fingertip touch input includes differentiating the fingertip touch input from other input to the digitizer sensor.

14. The method according to claim 13, wherein the other input is generated by a palm of a user.

15. The method of claim 1, comprising recognizing fingertip touch in response to the spatial pattern of signal amplitudes having amplitudes in a central portion of a detect touch area that taper down toward a peripheral portion of the detected touch area.

16. A system for verifying a fingertip input to a digitizer comprising:
   a digitizer sensor comprising an array of conductive lines; and
   a controller operative
      to obtain a spatial pattern of signal amplitudes from input provided over a plurality of the conductive lines;
      to determine a number of conductive lines associated with a gradient below a pre-defined gradient threshold; and
      to verify a fingertip touch in response to the number of conductive lines determined being below a defined number of conductive lines.

17. The system according to claim 16, wherein the array of conductive lines includes two orthogonal sets of parallel conductive lines forming a grid.

18. The system according to claim 16, wherein pairs of the conductive lines are input to differential amplifiers, and wherein the pattern is a pattern of differential amplifier outputs.

19. The system according to claim 18, wherein the pairs of the conductive lines are non-adjacent conductive lines.

20. The system according to claim 16, wherein the controller is operative to determine the spatial pattern of signal amplitudes across the plurality of the conductive lines above a pre-defined amplitude threshold.

21. The system according to claim 16, wherein the controller is operative to determine a spatial pattern of signal amplitude gradients across the plurality of the conductive lines.

22. The system according to claim 16, wherein the controller is operative to determine a spatial pattern of signal amplitude gradients above a pre-defined gradient threshold across the plurality of the conductive lines.

23. The system according to claim 16, wherein the pattern of signal amplitudes is detected using a capacitive touch method.

24. The system according to claim 23, wherein the controller is operative to determine a ratio of dimensions of an area from which the pattern is detected and to determine if the ratio is within a pre-defined range of ratios qualifying for verifying fingertip touch.

25. The system according to claim 24, wherein the controller is operative to determine if the area is within a pre-defined range of areas qualifying for verifying fingertip touch and to determine if the dimension is within a pre-defined range of dimensions qualifying for verifying fingertip touch.

26. The system according to claim 16, wherein the controller is operative to determine a contour from the spatial pattern.

27. The system according to claim 16, wherein the controller is operative to detect multi-touch input.

28. The system according to claim 16, comprising a host computer, wherein the host computer is in communication with the controller and wherein the controller transmits input verified as fingertip input to the host computer.

29. The system according to claim 16, wherein the controller is operative to differentiate fingertip touch input from other input to the digitizer sensor.

30. The system according to claim 29, wherein the other input is generated by a palm of a user.

31. A method for verifying a fingertip touch input to a digitizer, the method comprising:
   obtaining a spatial pattern of signal amplitudes from input provided over a plurality of contiguous conductive lines of a digitizer sensor, wherein the plurality of contiguous conductive lines is more than two contiguous conductive lines;
   determining gradients across the spatial pattern of signal amplitudes obtained from the input provided over the plurality of contiguous conductive lines;
   comparing a spatial pattern of the gradients across the spatial pattern of signal amplitudes to a pre-determined fingertip characteristic;
   determining a number of gaps in the spatial pattern of the gradients; and
   recognizing a fingertip touch input based on the comparison to the pre-determined fingertip characteristic.

32. The method according to claim 31, wherein pairs of the conductive lines are input to differential amplifiers, and wherein the pattern of signal amplitudes is a pattern of differential amplifier outputs.

33. The method according to claim 31 comprising defining a maximum number of gaps below which the spatial pattern of the gradients qualifies for verifying fingertip touch.

34. The method according to claim 31, wherein recognizing the fingertip touch input includes differentiating the fingertip touch input and a palm of a user.

35. The method according to claim 31 comprising comparing a spatial pattern of the gradients across the spatial pattern of the signal amplitudes to a pre-determined fingertip characteristic.

36. The method of claim 31, wherein the gaps in the spatial pattern of the gradients corresponds to gradients below a pre-defined gradient threshold.

37. The method of claim 31, wherein the spatial pattern of signal amplitudes is obtained from input provided over two orthogonal sets of parallel conductive lines forming a grid.

38. The method of claim 31, comprising recognizing fingertip touch in response to the spatial pattern of signal amplitudes having amplitudes in a central portion of a detect touch area that taper down toward a peripheral portion of the detected touch area.

39. A system for verifying a fingertip input to a digitizer comprising:
   a digitizer sensor comprising an array of conductive lines; and
   a controller operative to obtain a spatial pattern of signal amplitudes from input provided over a plurality of contiguous conductive lines of the array; to determine a spatial pattern of gradients across the spatial pattern of the signal amplitudes; to determine a number of gaps in the spatial pattern of the gradients; to compare the spatial pattern of gradients determined to a pre-determined fingertip characteristic; and to verify a fingertip touch based on the comparison to the fingertip characteristic, wherein the plurality of contiguous conductive lines is more than two contiguous conductive lines.

40. The system according to claim 39, wherein pairs of the conductive lines are input to differential amplifiers, and wherein the pattern is a pattern of differential amplifier outputs.

41. The system according to claim 39, wherein the controller is operative to reject an input signal corresponding to a pattern with gaps above a pre-defined maximum number of gaps.

42. The system according to claim 39, wherein the controller is operative to differentiate fingertip touch input from input generated by a palm of a user.

43. The system of claim 39, wherein the gaps in the spatial pattern of the gradients corresponds to gradients below a pre-defined gradient threshold.

* * * * *